United States Patent
Moeller et al.

(10) Patent No.: US 10,648,578 B2
(45) Date of Patent: May 12, 2020

(54) SANITARY FITTING

(71) Applicant: GROHEDAL Sanitaersysteme GmbH, Porta Westfalica (DE)

(72) Inventors: Joerg Moeller, Porta Westfalica (DE); Christian Koch, Porta Westfalica (DE)

(73) Assignee: GROHEDAL Sanitaersysteme GmbH, Port Westfalica (DE)

( * ) Notice: Subject to any disclaimer, the term of this patent is extended or adjusted under 35 U.S.C. 154(b) by 155 days.

(21) Appl. No.: 15/639,635

(22) Filed: Jun. 30, 2017

(65) Prior Publication Data
US 2018/0003308 A1    Jan. 4, 2018

(30) Foreign Application Priority Data

Jul. 1, 2016 (DE) .................. 10 2016 008 000

(51) Int. Cl.
*F16K 11/085* (2006.01)
*F16K 27/06* (2006.01)
*F16K 11/076* (2006.01)

(52) U.S. Cl.
CPC ........ *F16K 11/0856* (2013.01); *F16K 11/076* (2013.01); *F16K 27/065* (2013.01)

(58) Field of Classification Search
CPC .............. F16K 27/065; F16K 11/076; F16K 11/08–11/0856; F16K 5/18; F16K 5/181; F16K 5/182; F16K 5/184; F16K 5/185; F16K 5/187; E03C 1/04

USPC ........................................................ 251/192
See application file for complete search history.

(56) References Cited

U.S. PATENT DOCUMENTS 4,171,711 A * 10/1979 Bake .................. F16K 5/045
                                              137/312

FOREIGN PATENT DOCUMENTS

DE    10 2013 011 598 A1   1/2015
WO    WO-0186179 A1 * 11/2001 .......... F16K 11/0853

* cited by examiner

*Primary Examiner* — Michael R Reid
(74) *Attorney, Agent, or Firm* — Muncy, Geissler, Olds & Lowe, P.C.

(57) ABSTRACT

A sanitary fitting with a fitting body with a hollow cylindrical mixing shaft chamber in which a mixing shaft is rotatably supported about an axis of rotation. A hot and cold water inlet and a mixed water outlet open into the hollow cylindrical mixing shaft chamber, and wherein the mixing shaft has a control contour on the outer circumference which delimits a mixing chamber, which as a function of the rotational position of the mixing shaft fluidically connects the hot water inlet and/or the cold water inlet to the mixed water outlet in order to adjust a mixed water temperature. The mixing chamber of the mixing shaft is fluidically decoupled from the hot water or cold water inlet port while forming a fluid-tight valve gap between a sealing surface of the control contour of the mixing shaft and the inner peripheral wall of the hollow cylindrical mixing shaft chamber.

13 Claims, 3 Drawing Sheets

SANITARY FITTING

This nonprovisional application claims priority under 35 U.S.C. § 119(a) to German Patent Application No. 10 2016 008 000.0, which was filed in Germany on Jul. 1, 2016, and which is herein incorporated by reference.

BACKGROUND OF THE INVENTION

Field of the Invention

The invention relates to a sanitary fitting with a fitting body according to the preamble of claim 1.

Description of the Background Art

From DE 10 2013 011 598 A1, a generic sanitary fitting with a fitting body is known which comprises a mixing shaft bore, in which a mixing shaft, which the user can operate by rotation, is rotatably mounted about a rotational axis. A hot water inlet and a cold water inlet as well as a mixed water outlet open into the mixing shaft bore. The mixing shaft has a control contour on the circumference, which delimits a mixing chamber. As a function of the rotational position of the mixing shaft, which can be adjusted by the user, the hot water inlet and/or the cold water inlet can be fluidically connected to the mixed water outlet via the shaft-side mixing chamber in order to adjust a mixed water temperature for the mixed water flowing from the sanitary fitting. Provided that the mixing shaft is rotated in a hot water or cold water end position up to the stop, the mixing chamber of the mixing shaft is fluidically decoupled from the hot water or cold water inlet port, while forming a fluid-tight valve gap between a sealing surface of the control contour of the mixing shaft and an inner peripheral wall of the mixing shaft hole in the fitting body.

In the conventional art, a valve gap between the hot water or cold water inlet and the mixing chamber is not hermetically fluid-tight, but rather slightly permeable to liquid, forming a so-called transverse flow through the valve gap in the hot water/cold water end positions. In a cold water end position of the mixing shaft, the transverse flow leads to an undesired temperature increase of the cold water flowing from the sanitary fitting. Vice versa, in a hot water end position, the transverse flow leads to an undesired temperature reduction of the hot water flowing from the sanitary fitting.

Typically, both the fitting body and the mixing shaft are made of a metal, for example brass. In this case, the mixing shaft may be rotatably supported in a close fit in the mixing shaft bore of the fitting body, with a correspondingly reduced transverse flow. The close fit between the mixing shaft and the mixing shaft bore of the fitting body is realized by chip machining in a complex manner in terms of technical production, so that a component clearance in a range of $\frac{1}{100}$ millimeter results.

Specifically, in plastic manufacturing, there is the problem that the component tolerance between the fitting body and the mixing shaft increases, whereby the gap dimension of the fluid-tight valve gap between the hot water or cold water inlet and the mixing chamber also increases. This in turn leads to a disadvantageously large transverse flow.

SUMMARY OF THE INVENTION

It is therefore an object of the invention to provide a sanitary fitting in which the effectiveness of the sanitary fitting is enhanced in a simple manner.

In an exemplary embodiment, the invention is based on the facts that when producing a component with greater component tolerances, the transverse flow inevitably also increases. Against this background, the sanitary fitting has at least one pressure element acting between the fitting body and the mixing shaft, which compresses the sealing surface of the control contour of the mixing shaft against the inner peripheral wall of the mixing shaft bore (hereinafter also referred to as a hollow cylindrical mixing shaft chamber), with a predefined compressive force as well as with a reduction of the valve gap between the sealing surface of the mixing shaft and the inner peripheral wall of the mixing shaft bore.

A simple and effective compressive force acting upon the valve gap is of great importance for the effectiveness of the invention. Against this background, the pressure element can be arranged diametrically opposite to the inlet ports of the hot water and cold water inlets with respect to the mixing shaft. With regard to an ideally hermetical seal of the valve gap, it is preferable if the compressive force applied by the pressure element, considered in the circumferential direction, only acts on the valve gap in a locally limited manner, that is, does not act continuously in the circumferential direction against the inner peripheral wall of the hollow cylindrical mixing shaft chamber.

In a particularly simple and effective embodiment, the pressure element can be realized as an annular segment of an O-ring. The O-ring can be a simple sealing ring, for example, of an elastomeric material, as is otherwise employed in the usual manner for sealing between the mixing shaft and the mixing shaft bore in the fitting body. Therefore, the O-ring may have a universally circumferentially constant circular cross-section in the undeformed state of production.

The O-ring acting as a pressure element can be arranged in a circumferential, radially outwardly open annular groove of the mixing shaft. So that the abovementioned compressive force in the O-ring can be built up, it is necessary that the ring segment of the O-ring diametrically opposing the inlet ports between the inner peripheral wall of the mixing shaft bore and the mixing shaft is compressed, thereby building up the compressive force.

The abovementioned compression of the ring segment of the O-ring can be particularly easily technically implemented in the following manner: the inner peripheral wall of the mixing shaft bore can be configured with an additional supporting contour. The space conditions between the supporting contour and the rotatably mounted mixing shaft in the mixing shaft bore can be configured such that the ring segment of the O-ring is compressed by the supporting contour against the groove bottom of the circumferential annular groove of the mixing shaft, whereby the compressive force acting on the valve gap builds up. The line of action of the compressive force that is generated always runs—even when the mixing shaft is rotationally actuated—through the axis of rotation of the mixing shaft and through the valve gap.

As mentioned above, the supporting contour formed on the inner peripheral wall causes the ring segment of the O-ring to be compressed. For efficient compression, it is preferred that the supporting contour is arranged in radial alignment with the ring segment of the O-ring as well as with the annular groove of its mixing shaft. Furthermore, when viewed in a section plane perpendicular to the rotational axis, the inner peripheral wall can have a cylinder radius at the supporting contour which, in comparison to the cylinder radius, is reduced by wall sections of the inner circumference adjacent thereto in the circumferential direction.

In a technical implementation, the annular groove, in particular the base of the groove, may be continuously rotationally symmetrical to the rotational axis of the mixing shaft in the circumferential direction. In addition, the inner peripheral wall of the fitting body can be rotationally symmetrical with respect to the cylinder axis of the mixing shaft bore, with the exception of the abovementioned supporting contour on the inner peripheral wall. The cylinder axis and the rotational axis of the mixing shaft are coaxially aligned with one another.

The outlet port of the mixed water outlet and the inlet ports for the cold water and hot water inlets are disposed in the fitting body in the sanitary fitting within a wet area of the mixing shaft bore. The wet area is usually delimited, outwardly on both sides from the dry areas in the axial direction, by fluid seals, i.e., with the aid of O-ring seals. The O-ring seals also extend in mixing shaft ring grooves, wherein the O-ring seals are sealingly compressed approximately with a uniform compression force in the circumferential direction against the radially external inner peripheral wall of the mixing shaft bore. The pressure element according to the invention is preferably arranged not in the wet area, but rather in the axial direction outside the fluid seals in the dry areas.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
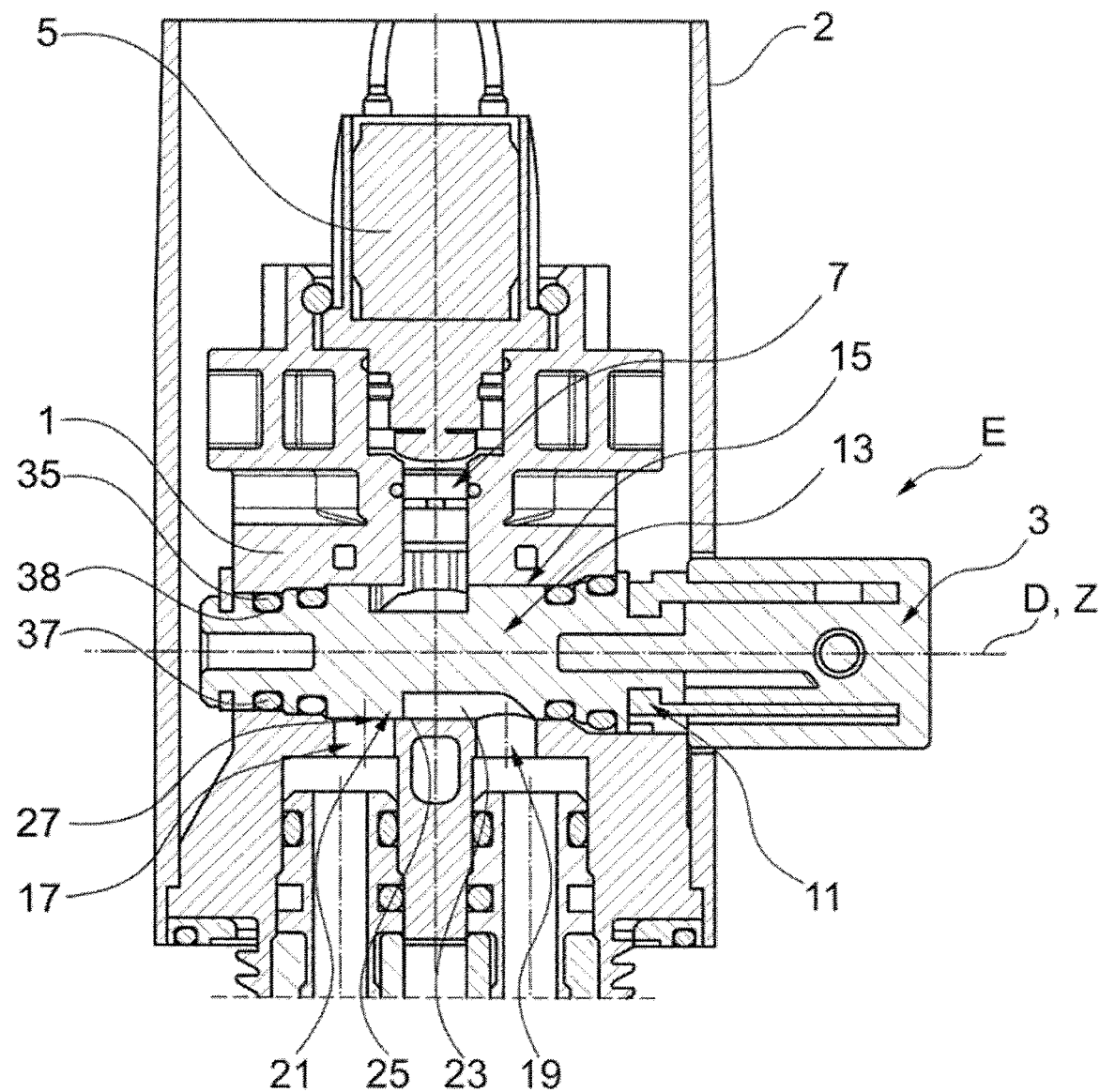
FIG. 1 is a partial sectional view of a sanitary fitting.

FIG. 1 shows a sanitary fitting with a fitting body 1, for example made of plastic or brass. The fitting body 1 is disposed within a decorative sleeve 2. The sanitary fitting also includes a mixing lever 3 which is pivotable about an axis of rotation D to adjust a temperature of the mixed water flowing out of a water outlet of the sanitary fitting (not shown). In addition, a solenoid valve 5 actuated by infrared is installed in the fitting body 1, the latter closing a mixed water outlet 7, which is guided to the water outlet when the sanitary fitting is not being used. When an infrared sensor senses hands or the like under the water outlet of the sanitary fitting, the valve 5 is opened, which allows the mixed water to flow from the water outlet of the sanitary fitting.

The mixing lever 3 is attached on a mixing shaft 13 with the interposition of a temperature limiter 11 which is not further described. The former is rotatably mounted about the rotation axis D in a hollow cylindrical mixing shaft bore 15 of the fitting body 1.

As is apparent from FIG. 1, the sanitary fitting has on its bottom side a respective cold water inlet 17 and a hot water inlet 19 which are connected to the water supply network and flow via inlet ports to the mixing shaft bore 15. The mixed water outlet 7 opens into the mixing shaft bore 15, diametrically opposite to both the cold water and hot water inlets 17, 19 with respect to the axis of rotation D. The mixing shaft 13 has on its outer circumference a control contour 21 which delimits a mixing chamber 23. The mixing chamber 23 of the mixing shaft 13, as a function of its rotational position, may variegate a flow passage of the cold water and hot water inlets 17, 19 to the mixing chamber 23 on the shaft side. In this case, in a hot water end position E shown in FIG. 1 or 2, the mixing chamber 23 of the mixing shaft can be flow-decoupled from the cold water inlet 17. Conversely, in a cold water end position (not shown), the mixing chamber 23 of the mixing shaft may be fluidically decoupled from the hot water inlet 19. In the hot water end position E shown in FIG. 1, the fluidic decoupling is realized by forming a fluid-tight valve gap 25 between a sealing surface 27 of the control contour 21 of the mixing shaft and the inner peripheral wall 29 of the mixing shaft bore 15.

Figure 2:
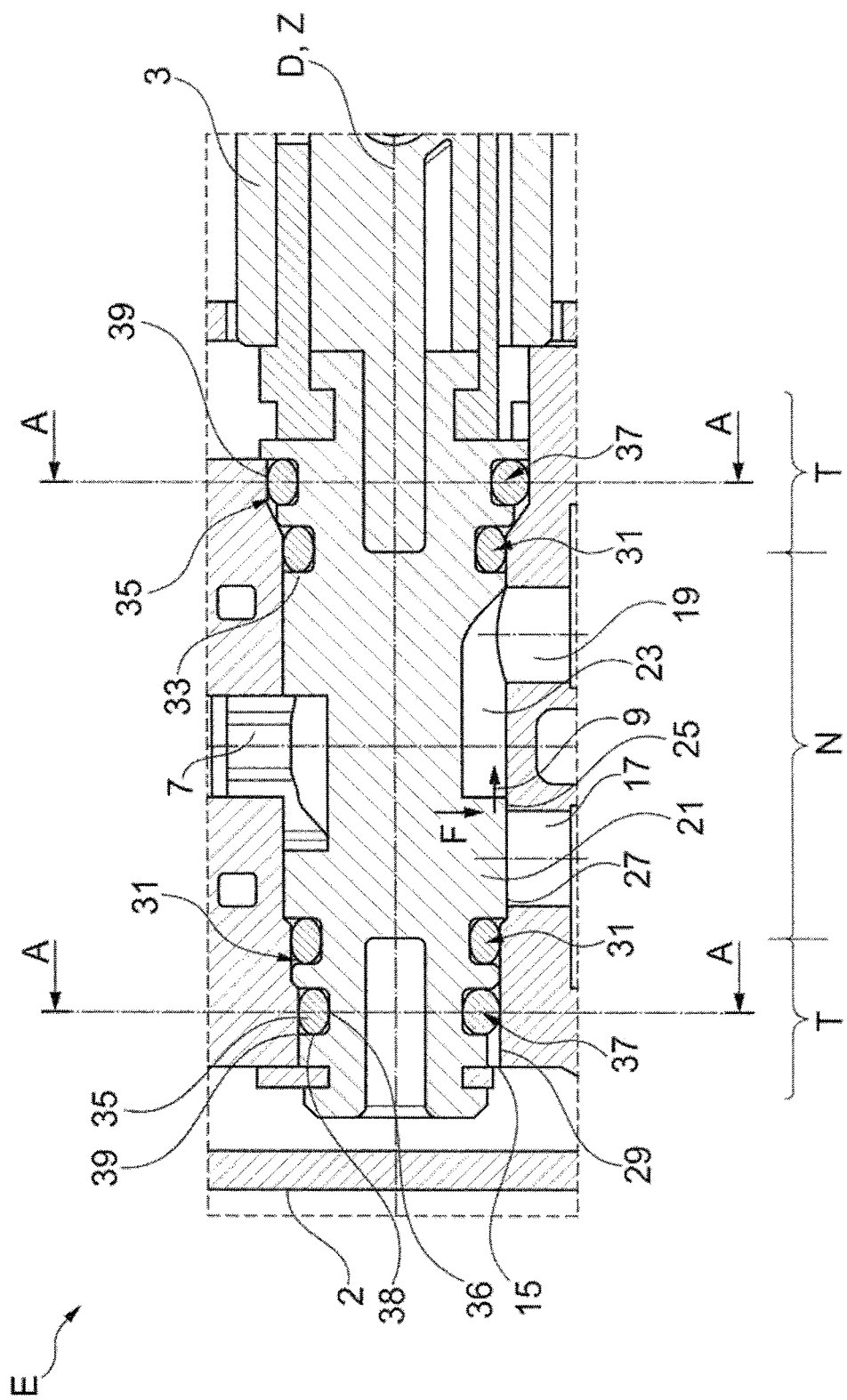
FIG. 2 is a detailed view from FIG. 1.

The outlet ports of the mixed water outlet 7 and the cold water and hot water inlets 17, 19 are arranged in FIG. 2 within a wet area N. The wet area N is delimited outwardly on both sides by means of fluid seals 31 of axially external dry areas T when viewed in the axial direction. The two fluid seals 31 are configured in common practice as O-ring seals which are inserted in annular grooves 33 (FIG. 2) of the mixing shaft 13 and fluid-tightly press against the inner peripheral wall 29. Both the inner peripheral wall 29 and the annular grooves 33 are configured rotationally symmetrical with respect to the cylinder axis Z, which is coaxial to the axis of rotation D.

Axially on both sides outside the two fluid seals 31, the mixing shaft 13 is extended respectively to the dry areas T. In each of the dry areas T, a respective pressure element 35 is arranged, which is supported between the inner peripheral wall 29 of the fitting body 1 and the mixing shaft 13. By means of the pressure element 35, a compressive force F is produced, with which the mixing shaft 13 is compressed with the sealing surface 27 of its control contour against the inner peripheral wall 29 of the mixing shaft bore 15 to reduce the valve gap 25.

Figure 3:
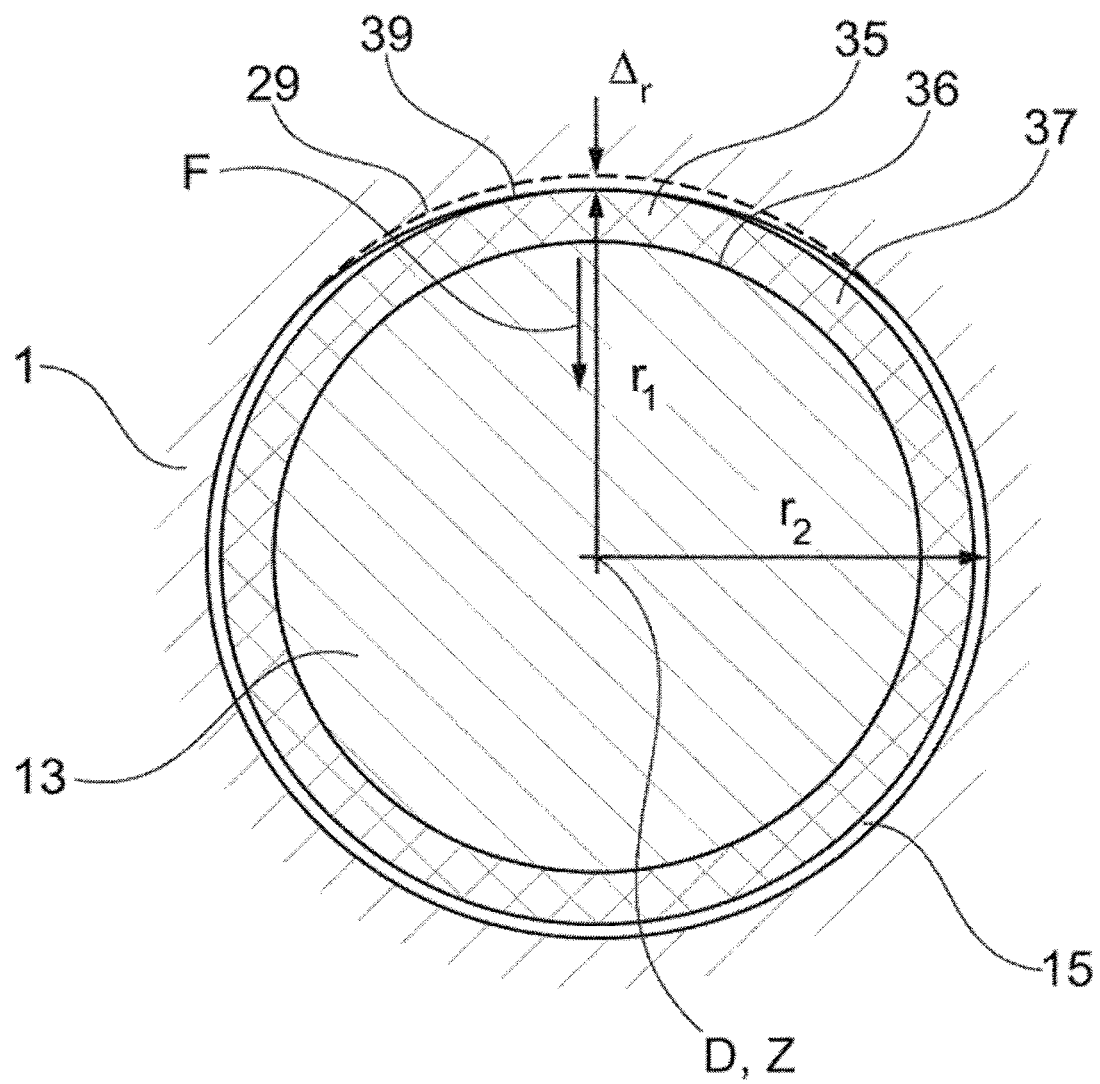
FIG. 3 is a sectional view along the sectional plane A-A from FIG. 2.

In the embodiment shown, the pressure element 35 is a ring segment of an O-ring 37, which is made from a resilient elastomeric material. The O-ring 37 is disposed in a circumferential, radially outwardly open annular groove 38 of the mixing shaft 13. Unlike a conventional O-ring seal, the O-ring 37 (as shown in the installation position in the figures) is not circumferentially continuously pressurized, but only in the area of the ring segment 35, which in FIGS. 2 and 3 is compressed diametrically opposed to the cold water and hot water inlets 17, 19. Due to the compression of the ring segment 35, the compressive force F applied on the valve gap 25 builds up.

In FIG. 3, the O-ring 37 is emphasized by cross-hatching. The cross-hatching is drawn more narrowly in the compressed ring segment 35 of the O-ring 37 than in the O-ring portion adjoining the ring segment 35.

The above-mentioned compression of the ring segment 35 of the O-ring 37 is realized in FIGS. 2 and 3 by a supporting contour 39 on which the inner peripheral wall 29 has a cylinder radius $r_1$. In FIG. 3, the cylinder radius $r_1$ is smaller by a radial offset $\Delta r$ (FIG. 3) than the cylinder radius $r_2$ of the inner peripheral wall sections s adjacent thereto in the circumferential direction. In the circumferential direction outside of the supporting contour 39, the O-ring 37 is thus not compressed, but rather not at all or only slightly pressurized.

In this way, in the illustrated hot water end position E, a transverse flow 9 (FIG. 2) can be further reduced or even prevented by the fluid-tight valve gap 25 between the sealing surface 27 of the control contour and the inner peripheral wall 29, in spite of greater component tolerances between the mixing shaft 13 and the mixing shaft bore 15.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A sanitary fitting comprising:
    a fitting body;
    a hollow cylindrical mixing shaft chamber, in which a mixing shaft, which is adapted to be operated by a user via a rotation, is rotatably supported about an axis of rotation;
    a hot water inlet;
    a cold water inlet;
    a mixed water outlet open into the hollow cylindrical mixing shaft chamber, the mixing shaft having a control contour on an outer periphery which delimits a mixing chamber, which as a function of the rotational position of the mixing shaft fluidically connects the hot water inlet and/or the cold water inlet to the mixed water outlet to adjust a mixed water temperature, wherein, in at least one mixing shaft end position, the mixing chamber of the mixing shaft is fluidically decoupled from the hot water or cold water inlet port while forming a fluid-tight valve gap between a sealing surface of the control contour of the mixing shaft and an inner peripheral wall of the hollow cylindrical mixing shaft chamber; and
    at least one pressure element acting between the fitting body and the mixing shaft, which compresses the mixing shaft with the sealing surface of its control contour against the inner peripheral wall of the hollow cylindrical mixing shaft chamber with a compressive force and reducing the valve gap,
    wherein the at least one pressure element comprises a ring segment of an O-ring,
    wherein the ring segment between the inner peripheral wall of the hollow cylindrical mixing shaft chamber and the mixing shaft is compressed while the compressive force is building,
    wherein the O-ring section adjoining the ring segment in the circumferential direction is not compressed, and
    wherein the hot water inlet, the cold water inlet and the mixed water outlet are disposed within a wet area of the mixing shaft and the ring segment of the O-ring is arranged diametrically opposite to the hot water inlet and the cold water inlet in a dry area of the mixing shaft.

2. The sanitary fitting according to claim 1, wherein, with respect to the mixing shaft, the pressure element is arranged diametrically opposite to the inlet ports of the hot water and cold water inlets.

3. The sanitary fitting according to claim 1, wherein the ring segment is made of elastomeric material,
    wherein the O-ring is arranged in a circumferential, radially outwardly open annular groove of the mixing shaft.

4. The sanitary fitting according to claim 1, wherein the compressive force applied by the pressure element, as viewed in the circumferential direction, only acts on the valve gap in a locally delimited manner and does not act continuously in the circumferential direction.

5. The sanitary fitting according to claim 3, wherein for compression of the ring segment of the O-ring, the inner peripheral wall of the hollow cylindrical mixing shaft chamber has a supporting contour, and
    wherein the supporting contour presses the ring segment of the O-ring against a groove bottom of the circumferential annular groove of the mixing shaft, while building the compressive force acting on the valve gap.

6. The sanitary fitting according to claim 5, wherein the supporting contour formed on the inner peripheral wall of the hollow cylindrical mixing shaft chamber is arranged in radial alignment with the ring segment of the O-ring and with the annular groove of the mixing shaft.

7. The sanitary fitting according to claim 5, wherein when viewed in a cross-section perpendicular to the axis of rotation of the mixing shaft, the inner peripheral wall has a cylinder radius on the supporting contour, which is reduced by a radial offset by the inner peripheral wall sections adjacent to the supporting contour in the circumferential direction.

8. The sanitary fitting according to claim 5, wherein the annular groove is rotationally symmetrical to the rotational axis of the mixing shaft, or
    wherein the inner peripheral wall is rotationally symmetrical to the cylinder axis of the hollow cylindrical mixing shaft chamber with the exception of the supporting contour on the inner peripheral wall, or
    wherein the cylinder axis and the axis of rotation of the mixing shaft are coaxial to each other.

9. A sanitary fitting comprising:
    a fitting body;
    a mixing shaft rotatably supported about an axis of rotation, the mixing shaft having a hollow cylindrical mixing shaft chamber and a control contour on an outer periphery of the mixing shaft;
    a hot water inlet;
    a cold water inlet;
    a mixed water outlet open to the hollow cylindrical mixing shaft chamber;
    a mixing chamber, delimited by the control contour, which, as a function of the rotational position of the mixing shaft, fluidically connects the hot water inlet and/or the cold water inlet to the mixed water outlet to adjust a mixed water temperature, wherein the mixing chamber is fluidically decouplable from the hot water or cold water inlet port while forming a fluid-tight valve gap between a sealing surface of the control contour of the mixing shaft and an inner peripheral wall of the hollow cylindrical mixing shaft chamber; and
    a sealing ring having a ring segment acting between the fitting body and the mixing shaft, the ring segment compressing the mixing shaft against the inner peripheral wall of the hollow cylindrical mixing shaft chamber with a compressive force,
    wherein, while compressive force is building, only the ring segment is compressed while a remainder of the sealing ring is not compressed, and
    wherein the hot water inlet, the cold water inlet and the mixed water outlet are disposed within a wet area of the mixing shaft and the ring segment of the O-ring is arranged diametrically opposite to the hot water inlet and the cold water inlet in a dry area of the mixing shaft.

10. The sanitary fitting according to claim 9, wherein the hollow cylindrical mixing shaft chamber has a support contour formed on the inner peripheral wall, the support contour configured to compress the ring segment.

11. The sanitary fitting according to claim 9, wherein the hollow cylindrical mixing shaft chamber has a support contour formed on the inner peripheral wall, the support contour configured to compress only the ring segment.

12. The sanitary fitting according to claim 9, wherein the mixing shaft comprises an annular groove in which the sealing ring is formed, and wherein the hollow cylindrical mixing shaft chamber has a support contour formed on the inner peripheral wall, the support contour configured to compress the ring segment against a bottom of the annular groove.

13. The sanitary fitting according to claim 10, wherein the support contour is arranged in radial alignment with the ring segment.

* * * * *